United States Patent [19]

Blow, Jr.

[11] 4,029,326
[45] June 14, 1977

[54] BICYCLE CONSTRUCTION

[76] Inventor: James H. Blow, Jr., 23 Palisade Ave., Piscataway, N.J. 08854

[22] Filed: Jan. 21, 1976

[21] Appl. No.: 651,211

[52] U.S. Cl. .............................. 280/7.16; 280/231
[51] Int. Cl.² ........................................ B62K 13/00
[58] Field of Search ............... 280/231, 7.16, 222, 280/273, 230

[56] References Cited

UNITED STATES PATENTS

| | | | |
|---|---|---|---|
| 516,435 | 3/1894 | Hasbrouck | 280/7.16 |
| 599,859 | 3/1898 | McFadden | 280/7.16 |
| 2,227,799 | 1/1941 | Sizelove | 280/7.16 |
| 2,277,727 | 3/1942 | Swanson | 280/231 X |
| 2,385,892 | 10/1945 | Swanson | 280/231 |
| 2,723,132 | 11/1955 | Oberwegner | 280/231 |
| 3,913,944 | 10/1975 | Blow, Jr. | 280/231 |

Primary Examiner—Robert R. Song
Attorney, Agent, or Firm—Jesse Woldman

[57] ABSTRACT

A bicycle construction for tandem operation includes an auxiliary drive means which may be attached to a conventional single operator bicycle between the main drive means and the rear wheel to permit operation by two occupants. The auxiliary drive means comprises a pair of first auxiliary sprockets each connected to an associated one of a pair of independently supported rotary pedals each of which is coupled to an associated fork of a forked rear wheel support. A pair of second auxiliary sprockets is mounted on the main drive means, each of the second auxiliary sprockets being coupled to a respective one of the main rotary pedals. A pair of support columns coupled to the bicycle frame may be provided to serve as an auxiliary seat support, at one end, and as an auxiliary rotary pedal support at its other end. The auxiliary crank arms associated with the auxiliary rotary pedals may be coupled to eccentrically mounted bearing for adjusting the spacing between the auxiliary drive means and the main drive means.

9 Claims, 12 Drawing Figures

BICYCLE CONSTRUCTION

BACKGROUND OF THE INVENTION

1. Field of the Invention

The invention is directed to the field of vehicles and principally to a tandem bicycle construction.

2. Description of the Prior Art

Various prior art devices for converting a conventional single passenger bicycle to tandem pedalling operation are exemplified in U.S. Pat. No. 2,277,727 issued to D. A. Swanson on Mar. 31, 1942; U.S. Pat. No. 2,385,892 issued to D. A. Swanson on Oct. 2, 1945; U.S. Pat. No. 2,723,132 issued to A. R. Oberwegner on Nov. 8, 1955; and U.S. Pat. No. 3,913,944 issued to James H. Blow, Jr., applicant herein, on Oct. 21, 1975. The two Swanson patents disclose arrangements which require extensive modifications of the rear wheel hub portion of the bicycle which would preclude its use as a simple attachment to a conventional bicycle. The Oberwegner patent discloses a relatively complex mechanism in which the auxiliary operation describes a generally elliptical path of movement which may be found to be both awkward and uncomfortable for an operator unfamiliar with such motion. The Blow patent, although disclosing a simpler and more convenient assembly, still requires a careful adjustment and alignment of components to insure that the main and auxiliary drive mechanisms rotate in correspondence with one another during operation.

SUMMARY OF THE INVENTION

The present invention overcomes the limitations and difficulties noted above with respect to prior art devices by providing an auxiliary drive means which may be readily and conveniently attached to a conventional single passenger bicycle to provide a simple and inexpensive tandem pedalling arrangement. The auxiliary drive means comprises a pair of independently supported auxiliary rotary pedals each of which is coupled to a respective fork of the forked rear wheel support intermediate the main drive means and the rear wheel on the bicycle frame and drives an associated first auxiliary sprocket which is coupled via a chain drive to a second auxiliary sprocket located on a respective main rotary pedal. Means may be provided to disengage the auxiliary rotary pedals from their respective auxiliary sprockets to reduce the torque exerted on the main rotary pedals when the bicycle is powered by only one occupant operating the main drive means. A pair of auxiliary support columns which are readily attachable to the bicycle frame may be provided to serve as an auxiliary seat support at their upper ends and as a bearing support for the auxiliary rotary pedals at their lower ends. The auxiliary rotary pedals are mounted on respective crank arms which may be journalled on eccentrically mounted bearings to permit a rapid and simple tension adjustment of the chain drive coupling the main and auxiliary drive means. The upper ends of the auxiliary support columns may be further coupled to one end of a preferably adjustable strut the other end of which is rigidly coupled to the bicycle frame to maintain the support columns in a predetermined position relative to the bicycle frame. It is, therefore, an object of this invention to provide auxiliary drive means for a conventional single occupant bicycle construction.

It is another object of this invention to provide a rapid, simple, and inexpensive means for converting a single occupant bicycle construction to tandem operation.

It is a further object of this invention to provide an auxiliary drive means which may be readily attached to a conventional single occupant bicycle construction.

It is yet another object of this invention to provide an auxiliary drive means for a conventional single occupant bicycle construction wherein the auxiliary drive means may be readily attached to and detached from the bicycle frame.

Other objects and features of the invention will be pointed out in the following description and claims and illustrated in the accompanying drawings which disclose, by way of example, the principles of the invention and the best modes contemplated for carrying it out.

BRIEF DESCRIPTION OF THE DRAWINGS

IN THE DRAWINGS

Figure 1:
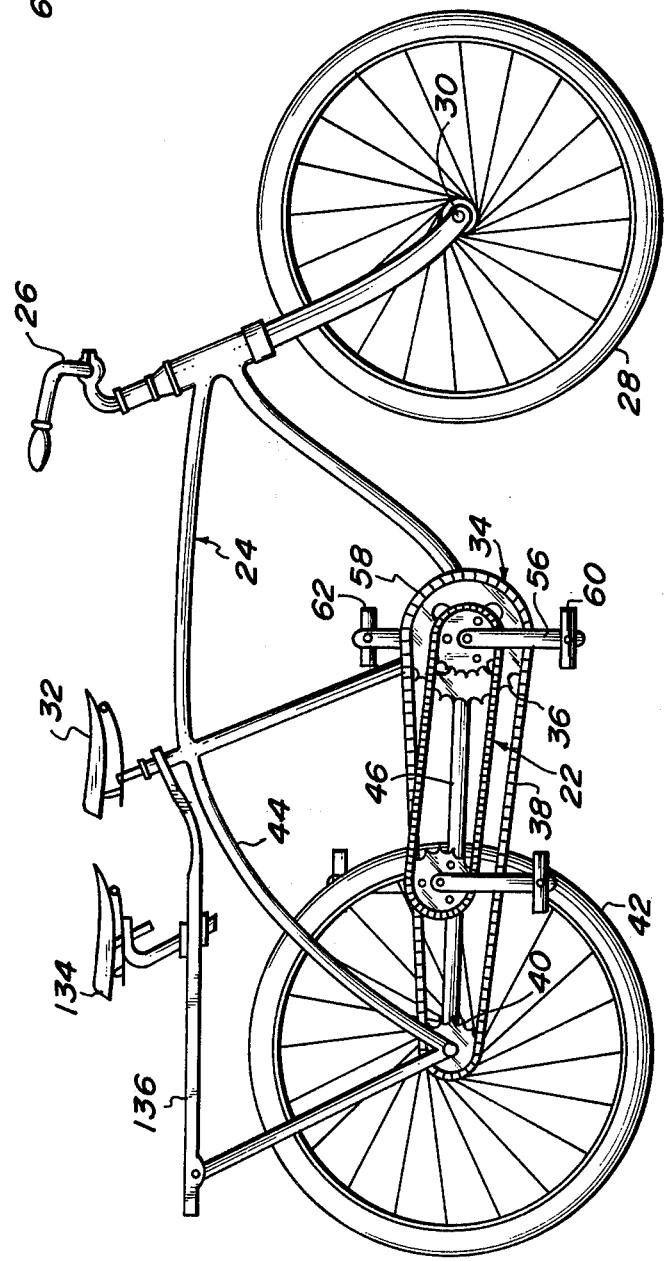

FIG. 1 is a side elevational view of a bicycle construction employing an auxiliary drive means constructed in accordance with the concepts of the invention.

Figure 2:
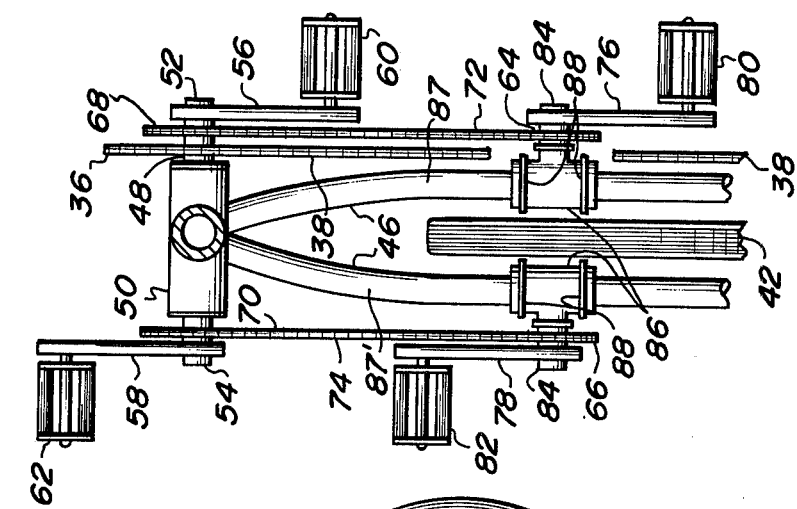

FIG. 2 is a fragmentary top plan view of a portion of the bicycle construction of FIG. 1.

Figure 3:
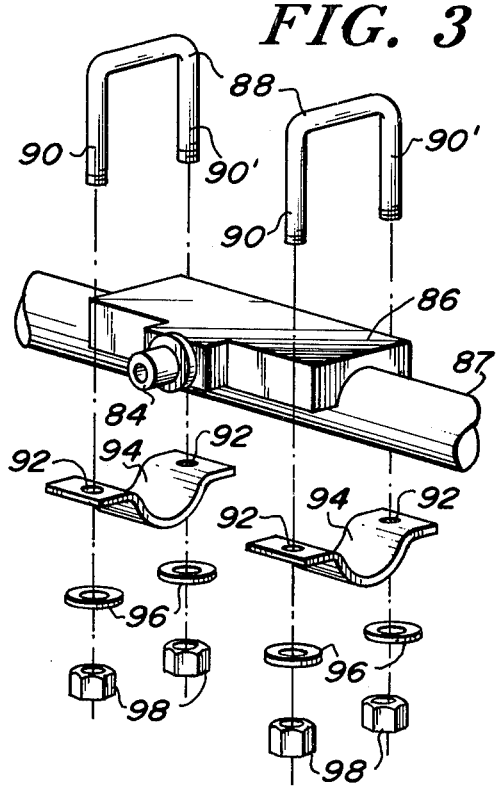

FIG. 3 is a fragmentary perspective view of the auxiliary drive means bearing support of the device of FIG. 1.

Figure 4:
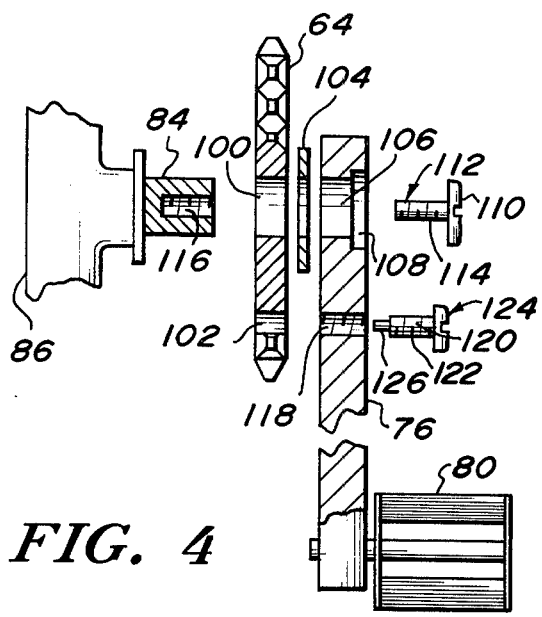

FIG. 4 is an exploded fragmentary top plan view, partly cut away and partly in section, of a portion of the auxiliary drive means of FIG. 1.

Figure 5:
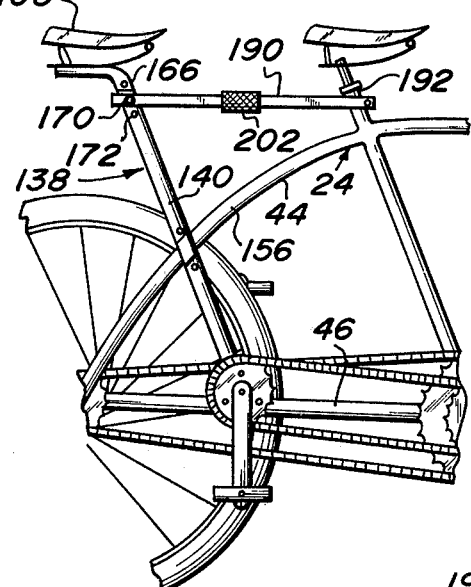

FIG. 5 is a fragmentary side elevational view of a further embodiment of an auxiliary drive means constructed in accordance with the concepts of the invention.

Figure 6:
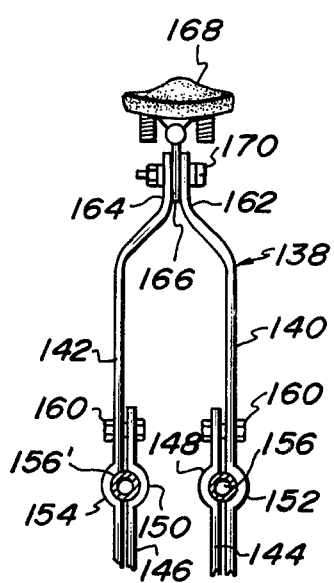

FIG. 6 is a fragmentary rear elevational view, partly in section, of a portion of the device of FIG. 5.

Figure 7:
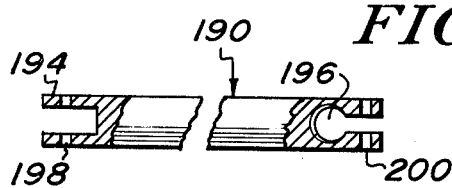

FIG. 7 is a fragmentary top plan view, partly cut away and partly in section, of a portion of the device of FIG. 5.

Figure 8:
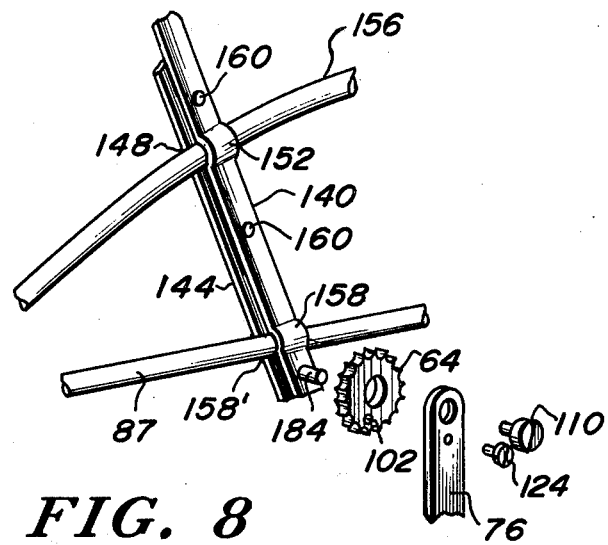

FIG. 8 is an exploded fragmentary perspective view of a portion of the device of FIG. 5.

Figure 9:
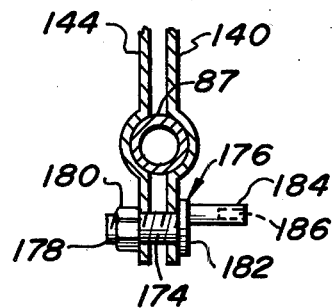

FIG. 9 is a fragmentary rear elevational view, partly in section, showing the details of a further embodiment of a portion of an auxiliary drive means constructed in accordance with the concepts of the invention.

Figure 10:
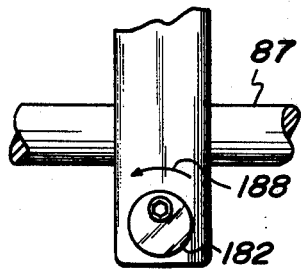

FIG. 10 is a fragmentary side elevational view of the construction shown in FIG. 9.

Figure 11:
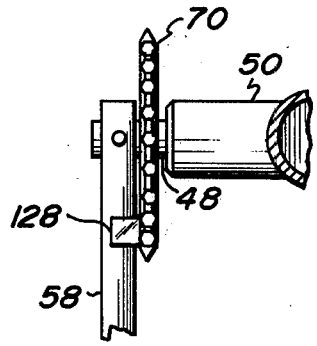

FIG. 11 is a fragmentary top plan view, partly in section, of a portion of the bicycle construction shown in FIG. 1.

Figure 12:
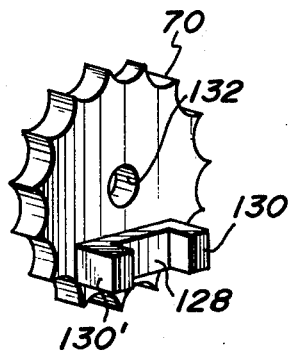

FIG. 12 is a perspective view of an auxiliary sprocket construction in accordance with the concepts of the invention.

Similar elements are given similar reference characters in each of the respective drawings.

DESCRIPTION OF THE PREFERRED EMBODIMENTS

Referring now to FIGS. 1, 2, 3, and 4 there is shown a bicycle 20 to which is attached an auxiliary drive means 22 constructed in accordance with the concepts of the invention. The bicycle 20 is of generally conventional construction and comprises a tubular frame 24 having at its forward end a pair of handlebars 26 coupled to a front wheel 28 rotatable about a shaft 30. The central portion of the frame includes a main seat 32 at the upper end of the frame 24, and a main drive means 34 at the lower end of the frame 24. The main drive means 24 includes a main sprocket 36 connected by way of a main chain drive 38 to a rear wheel sprocket 40 coupled to a rear wheel 42. The rear wheel 42 is attached to the frame 24 by way of an upper forked rear wheel support 44 and a lower forked rear wheel support 46. The main sprocket 36 is attached to a shaft 48 (FIG. 2) mounted in a bearing 50 coupled to the frame 24. The shaft 48 extends beyond the bearing 50 at both its ends 52 and 54 (FIG. 2), which ends 52 and 54 are each fixedly coupled to one end of a respective main crank arm 56, 58, the other end of which is coupled to a respective main rotary pedal 60, 62. The main drive means 34 is thus operatively employed in a conventional manner to power the bicycle 20 for movement along a roadway through the torque exerted by a single rider. The auxiliary drive means 22 is readily attached to the bicycle frame 24 and may be conveniently employed to utilize the effort of a second rider to assist the first rider in propelling the bicycle 20. The auxiliary drive means 22 comprises a pair of first auxiliary sprockets 64, 66, each independently coupled to a respective one of the forks of the lower forked rear wheel support 46, a pair of second auxiliary sprockets 68, 70, sprocket 68 being coupled to the main sprocket 36 and sprocket 70 being coupled to the main crank arm 58, a first auxiliary chain drive 72 connecting auxiliary sprocket 64 to auxiliary sprocket 68, a second auxiliary chain drive 74 connecting auxiliary sprocket 66 to auxiliary sprocket 70, a first auxiliary crank arm 76 for driving auxiliary sprocket 64, a second auxiliary crank arm 78 for driving auxiliary sprocket 66, a first auxiliary rotary pedal 80 rotatably mounted on auxiliary crank arm 76, and a second auxiliary rotary pedal 82 rotatably mounted on auxiliary crank arm 78. The auxiliary crank arms 76 and 78 are each independently rotatably coupled to a respective shaft portion 84 extending outwardly from a support member 86 attached to a respective fork 87, 87$^1$ of the lower rear wheel support 46 by way of a pair of U-shaped brackets 88 each having threaded ends 90 (FIG. 3) inserted through the respective apertures 92 in an associated bracket 94 and engaged by washers 96 and threaded nuts 98 for coupling each of the support members 86 to a respective fork 87, 87$^1$ of the forked rear wheel support 46. For the sake of explanation, there is shown in FIG. 4 an exploded view of the details of the assembly of one of the auxiliary crank arms 76 and 78 to a respective support member 86, including the first respective auxiliary sprocket 64, although it should be understood that both auxiliary crank arm and first auxiliary sprocket assemblies are constructed in the same manner. As illustrated in FIG. 4, the first auxiliary sprocket 64 comprises a central transverse aperture 100 dimensioned to provide a rotating fit over the shaft portion 84 of the support member 86, and a lock pin receiving hole 102 spaced from the aperture 100 and located preferably close to the outer perimeter of the sprocket 64. A spacing washer 104 is interposed between the crank arm 76 and the sprocket 64 to provide clearance for the first auxiliary chain drive 72 as it engages the sprocket 64. The auxiliary crank arm 76 is provided with a shaft receiving bore 106 having a recessed or undercut portion 108 for receiving the enlarged head portion 110 of a mounting bolt 112 having a threaded shank portion 114 adapted to extend through the crank arm bore 106, the washer 104, the sprocket 64, and into threaded engagement with an internally threaded aperture 116 located axially within the shaft portion 84 of the support member 86. To releasably couple the crank arm 76 to the sprocket 64, the crank arm 76 is provided with a threaded transverse aperture 118 spaced from the bore 106 and adapted to receive the threaded portion 120 of the shank 122 of a lock pin 124. The terminating end of the lock pin 124 comprises an unthreaded portion 126 of reduced diameter arranged to fit snugly within the hole 102 in the sprocket 64. The lock pin 124 is normally threadably engaged within the aperture 118 in the crank arm 76 sufficiently to cause the unthreaded portion 126 to extend through the aperture 118 and into engagement with the sprocket hole 102. In this manner the sprocket 64 is operatively coupled to the crank arm 76. Thus, movement of either the sprocket 64 or the crank arm 76 will cause a corresponding movement of the other member. To disengage the crank arm 76 from the sprocket 64, the lock pin 124 is rotated sufficiently in a suitable direction to cause the unthreaded portion 126 to be withdrawn from the hole 102. This feature may be found to be extremely useful where the main drive means 34 is being employed to operate the bicycle 20 and it is desired to remove the load of the auxiliary drive means 22 therefrom. With the auxiliary crank arm 76 disengaged from its associated sprocket 64, the auxiliary sprocket 64 will be free to rotate in response to the movement of the auxiliary chain drive 72 without a corresponding movement of the crank arm 76. Since both auxiliary crank arms 76 and 78 may be disengaged in this manner, a substantial reduction in the load exerted on the main drive means 34 may be accomplished. A similar arrangement may be readily employed in coupling the main crank arms 56 and 58 to their respective second auxiliary sprockets 68 and 70, when desired, although such construction will require a modification of each of the main crank arms 56 and 58 to include an aperture similar to 118 for receiving the lock pin 124. Alternatively, the second auxiliary sprocket 68 is coupled directly to the main sprocket 68 so that both move in unison when either is driven. The second auxiliary sprocket 70 is constructed preferably in the manner shown in FIG. 12 and comprises a bracket means 128 having spaced leg portions 130 and 130$^1$ arranged to straddle the main crank arm 58 to provide a coupling therebetween as shown in greater detail in FIG. 11. The sprocket 70 is further provided with a shaft receiving opening 132 for mounting the sprocket 70 on the shaft 48 and is dimensioned to provide a close rotating fit therebetween. Each of the remaining auxiliary sprockets 56, 64, and 66 may be constructed in a similar manner, if necessary or desirable, to provide a non-releasable coupling between such sprockets and their associated crank arms. As further shown in FIG. 1, there is provided an auxiliary seat 134 which may be conveniently attached to a horizontal support 136 typically included on a conventional single rider bicycle. The auxiliary seat 134 is adapted to carry the second rider who may then assist the first rider in powering the bicycle 20.

FIGS. 5 through 8 illustrate a further embodiment of a support means 138 for coupling the first auxiliary sprockets 64 and 66 their associated auxiliary crank arms 76 and 78, to the bicycle frame 24. The support means 138 comprises a right and left auxiliary support column 140 and 142 (FIG. 6) each being essentially a mirror image of the other. Each support column 140 and 142 further includes a respective backing plate 144, 146 (FIG. 6) having a respective first preformed portion 148, 150 located adjacent an oppositely formed first preformed portion 152, 154, respectively, on each of the support columns 140 and 142, for engaging a respective fork 156, 156[1] (FIG. 6) of the upper forked rear wheel support 44 therebetween. A similar arrangement of second preformed portions is provided at the lower end of each of the support columns 140 and 142 and backing plates 144 and 146 as illustrated with respect to the right support column 140 and its associated backing plate 144 in FIG. 8 and indicated by the numerals 158 and 158[1] therein. The second preformed portions are arranged to engage the respective forks 87 and 87[1] of the lower forked rear wheel support 46 in the manner shown in FIG. 8 with respect to the fork 87. Coupling bolts such as 160 are provided to draw the backing plates 144 and 146 and respective support columns 140 and 142 together to secure these parts to the bicycle frame in the desired location. As further illustrated in FIG. 6, each support column 140, 142 comprises an upper end 162, 164, respectively, suitably configured so that, as the support columns 140 and 142 are mounted on the bicycle frame 24 in the manner shown in FIG. 5, the ends 162 and 164 closely straddle a support post 166 extending from an auxiliary seat 168 and are held in engagement therewith by means of a coupling bolt 170 (FIG. 6) extending through aligned apertures in the post 166 and the ends 162 and 164 of the support columns 140 and 142, respectively. Both the post 166 and the ends 162 and 164 may be provided with a series of spaced apertures such as shown at 172 in FIG. 5 to permit adjustment of the height of the auxiliary seat 168. Each support column 140, 142 and its associated backing plate 144, 146 is provided at its lower end with a transverse bore or opening as shown in FIG. 9 for receiving the mounting post 174 of a support member 176. The mounting post 174 is provided with a threaded end portion 178 for receiving a nut 180 to lock the post 174 to the respective lower ends of the support columns 140 and 142, and the respective backing plates 144 and 146. An enlarged portion 182 is located at the base of the mounting post 174 to limit the extent of insertion of the post 174 into the respective apertures in the support columns and backing plates. Extending outwardly from the enlarged portion 182 of the support member 176 in a direction opposite to the mounting post 174 is a bearing portion 184 for receiving an associated auxiliary sprocket 64, 66, and auxiliary crank arm 76, 78, as shown in the exploded view in FIG. 8 which illustrates a portion of the right side assembly of the auxiliary drive means although it should be understood that both sides are similarly constructed. The bearing portion 184 is provided with a threaded aperture 186 similar to aperture 116 for receiving the mounting bolt 110. The bearing portion 184 may be oriented either in axial alignment with the post 174, or may be eccentrically located, as shown in FIG. 9, to provide a convenient means for taking up the slack in the auxiliary drive chain, 72, 74 after assembly. As shown in FIG. 10, rotation of the support member in the direction indicated by the arrow 188 will cause the eccentrically mounted bearing portion 184 to shift its position from a central axis rearwardly to increase the distance between the front main or auxiliary sprockets 36 and 70, respectively, and the associated rear or first auxiliary sprockets 64 and 66. Thus, each auxiliary chain drive 72 and 74 may be independently tightened or loosened for purposes of assembly or disassembly. The initial adjustment of the auxiliary chain drives 72 and 74 is accomplished by properly positioning the auxiliary support columns on the bicycle frame 24 prior to tightening the bolts 160 so that the chain drives 72 and 74 may be slipped over the respective sprockets on each side of the bicycle. The slack in the chain drives 72 and 74 may then be at least partially taken up by urging the lower ends of the auxiliary support columns 140 and 142 and their respective backing plates 144 and 146 rearwardly and then tightening the bolts 160. The final adjustment may then be made by rotating the support member 176 in a suitable direction to cause the first auxiliary sprockets 64 and 66, and their associated auxiliary crank arms 76 and 78 to be repositioned in the manner described heretofore. As further illustrated in FIGS. 5 and 7, a strut means 190 may be connected between the upper ends 162 and 164 of the support columns 140 and 142, respectively, and a forward portion 192 of the bicycle frame 24. The strut means 190 comprises a forked rearward end 194 arranged to straddle the respective upper ends 162 and 164 of the support columns 140 and 142. The other end of the strut means 190 is provided with a slotted opening 196 oriented at a suitable oblique angle to longitudinal axis of the strut means 190 to receive the portion 192 of the frame 24. Transverse openings such as 198 and 200 are provided at each end of the strut means 190 to receive mounting bolts or the like for clamping the strut means 190 to the respective adjacent parts. The strut means may comprise either a single element, or may be divided transversely into two sections coupled together with an adjusting sleeve 202 which may comprise a threaded interior (not shown) adapted to engage the adjacent ends of the two sections which may then be suitably externally threaded (not shown) so that rotation of the adjusting sleeve 202 in a suitable direction will cause the strut means 190 to elongate or contract in length in response thereto. The strut means 190 may then be employed to provide additional stiffening of support columns 140 and 142, and a further means for adjusting the position of the support members 176 relative to the main drive means 34.

It should be understood that, in assembling the auxiliary drive means 22 to the bicycle frame 24, the auxiliary crank arms 76 and 78 should be positioned in opposite directions to one another along parallel axes for convenience in operation, and should coincide with the main crank arms 56 and 58 for symmetry of movement, although this latter arrangement is not necessary for proper functioning of the device.

The embodiments of the invention in which an exclusive property or privilege is claimed are defined as follows:

1. In a bicycle construction of the type having a frame, a front wheel, a rear wheel rotatable about a rear axle, a main seat mounted on an upper portion of said frame, main drive means connected between a lower portion of said frame and said rear wheel and including a main sprocket and a main chain drive, said main chain drive being connected between said main sprocket and said rear wheel, a forked rear wheel support extending between said lower portion of said frame and said rear axle, and a pair of main rotary pedals coupled to said main sprocket for rotating said main drive means, the improvement comprising: auxiliary drive means connected to said forked rear wheel support forwardly of said rear axle and operatively coupled to said main drive means for assisting in the rotation thereof; and a pair of independently supported auxiliary rotary pedals coupled to said auxiliary drive means for rotating said auxiliary drive means, said auxiliary drive means comprising two pairs of auxiliary sprockets including a pair of first auxiliary sprockets connected to respective ones of said auxiliary rotary pedals adjacent said forked rear wheel support forwardly of said rear axle, and a pair of second auxiliary sprockets concentrically connected to and rotable with said main sprocket said auxiliary drive means further comprising a first auxiliary chain drive connected between one of said first auxiliary sprockets and a corresponding one of said second auxiliary sprockets, and a second auxiliary chain drive connected between the other of said first auxiliary sprockets and the other of said second auxiliary sprockets, one of said auxiliary rotary pedals being coupled to one fork of said rear wheel support, the other of said auxiliary rotary pedals being coupled to the other fork of said rear wheel support, each of said auxiliary rotary pedals being independently rotatable with respect to one another.

2. The improvement as defined in claim 1 further comprising an auxiliary seat mounted on an upper portion of said frame rearwardly of said main seat.

3. The improvement as defined in claim 1 further comprising a pair of auxiliary support columns mounted to said frame rearwardly of said main seat, each of said auxiliary support columns having a first end for supporting said auxiliary seat and a second end for supporting a respective one of said auxiliary rotary pedals.

4. The improvement as defined in claim 3 further comprising strut means connected between said first ends of said pair of auxiliary support columns and said frame for maintaining said support columns in a predetermined position relative to said frame.

5. The improvement as defined in claim 4 wherein said strut means further includes adjusting means for varying the length of said strut means.

6. The improvement as defined in claim 1 wherein each of said auxiliary rotary pedals is mounted on an auxiliary crank arm journalled on an eccentrically mounted bearing coupled to said frame for adjusting the spacing between said auxiliary rotary pedals and said main rotary pedals.

7. The improvement as defined in claim 6 wherein said auxiliary drive means comprises an auxiliary crank arm associated with each of said first and second auxiliary sprockets, said auxiliary drive means further including pin means removably engageable between said auxiliary sprocket and an associated one of said auxiliary crank arms such that when said pin means is in a first position said auxiliary sprocket is caused to rotate in correspondence with said associated crank arm, and when said pin means is in a second position, said auxiliary sprocket is free to rotate independently of said associated crank arm.

8. The improvement as defined in claim 7 wherein said pin means comprises a threaded shank portion engageable with said auxiliary crank arm, said pin means having an end portion engageable with said associated auxiliary sprocket.

9. The improvement as defined in claim 6 further comprising support means coupled to said frame for receiving said eccentrically mounted bearing.

* * * * *